United States Patent
Hariri

(10) Patent No.: US 9,015,828 B2
(45) Date of Patent: Apr. 21, 2015

(54) METHOD AND SYSTEM FOR AUTONOMOUS CONTROL AND PROTECTION OF COMPUTER SYSTEMS

(75) Inventor: Salim Hariri, Tucson, AZ (US)

(73) Assignee: Board of Regents, a Body Corporate of the State of Arizona, Acting for and on Behalf of The University of Arizona, Tuscson, AZ (US)

( * ) Notice: Subject to any disclaimer, the term of this patent is extended or adjusted under 35 U.S.C. 154(b) by 1422 days.

(21) Appl. No.: 12/304,111

(22) PCT Filed: Jun. 11, 2007

(86) PCT No.: PCT/US2007/070903
§ 371 (c)(1),
(2), (4) Date: Jul. 30, 2010

(87) PCT Pub. No.: WO2007/149725
PCT Pub. Date: Dec. 27, 2007

(65) Prior Publication Data
US 2011/0055920 A1    Mar. 3, 2011

Related U.S. Application Data

(60) Provisional application No. 60/804,422, filed on Jun. 9, 2006, provisional application No. 60/804,423, filed on Jun. 9, 2006, provisional application No. 60/804,424, filed on Jun. 9, 2006.

(51) Int. Cl.
*G06F 12/14*     (2006.01)
*G06F 21/55*     (2013.01)
*H04L 29/06*     (2006.01)

(52) U.S. Cl.
CPC ........... *G06F 21/552* (2013.01); *H04L 63/1408* (2013.01); *H04L 63/1425* (2013.01)

(58) Field of Classification Search
CPC .................... H04L 63/1408; H04L 63/1425
USPC ........................................... 726/22
See application file for complete search history.

(56) References Cited

U.S. PATENT DOCUMENTS 6,321,338 B1    11/2001    Porras et al.
6,983,317 B1 *   1/2006    Bishop et al. ................. 709/223
(Continued)

FOREIGN PATENT DOCUMENTS

EP            0 862 113       9/1998
WO       WO 2005/022416       3/2005

OTHER PUBLICATIONS

Dong et al., Autonomia: an Automatic Computing Environment, 2003, Retrieved from the Internet <URL: ieeexplore.ieee.org/xpls/abs_all.jsp?arnumber=1203684&tag=1>, pp. 1-8 as printed.*

(Continued)

*Primary Examiner* — Michael Chao
(74) *Attorney, Agent, or Firm* — McDonnell Boehnen Hulbert & Berghoff LLP

(57) ABSTRACT

A management system includes a plurality of components within a computer system. A plurality of component resource managers is provided, and each of the components is controlled by at least one of the plurality of component resource managers. A plurality of component management interfaces is also provided. Each of the components communicates with at least one of the controlling component resource managers via one of the component management interfaces. At least one runtime manager autonomously controls operation of the components and the component resource managers.

16 Claims, 7 Drawing Sheets

(56) References Cited

U.S. PATENT DOCUMENTS 7,058,968 B2    6/2006    Rowland et al.
2002/0032871 A1*    3/2002    Malan et al. .................. 713/201

OTHER PUBLICATIONS

Hariri et al., Quality-of-Protection (QoP)—An Online Monitoring and Self-Protection Mechanism, Oct. 2005, Retrieved from the Internet <URL: ieeexplore.ieee.org/xpls/abs_all.jsp?arnumber=1514527>, pp. 1-11 as printed.*

Chen et al.; MAFIC: Adaptive Packet Dropping for Cutting Malicious Flows to Push Back DDoS Attacks; Jun. 2005; Retrieved from the Internet <URL: http://ieeexplore.ieee.org/xpls/abs_all.jsp?arnumber=1437166&tag=1>; pp. 1-7 as printed.*

Hwang et al.; GridSec: Trusted Grid Computing with Security Binding and Self-defense Against Network Worms and DDoS Attacks; Mar. 2005; Retrieved from the Internet <URL: link.springer.com/chapter/10.1007/11428862_27>; pp. 1-9 as printed.*

Chen, H et al. "An Innovative Self-Configuration Approach for Networked Systems and Applications". IEEE International Conference on Computer Systems and Applications, Mar. 8, 2006, pp. 537-544.

Hariri, S et al. "The Autonomic Computing Paradigm", Cluster Computing, vol. 9, Issue 1, Jan. 2006, pp. 5-17.

Dong et al. "AUTONOMIA: An Autonomic Computing Environment" Conference Proceedings of the 2003 IEEE International Performance, Computing, and Communications Conference, Apr. 9-11, 2003, p. 61-68.

ISR/WO/IPRP—PCT/US07/70903 (14 pgs).

* cited by examiner

Quantifiable attributes for each resource class

| Compute | Utilization | Completion Rate | Response Time |
|---|---|---|---|
| Memory | Throughput | Page-Faults Rate | Access Time |
| Storage | Access Rate | Response Time | Cache Hit Ratio |
| Networking | Rx/Tx packets/sec | Error Rate | Latency |

```
1  While (Component ACAi is running) do
2      State = CRMi Monitoring (ACAi)
3      State_Deviation = State Compare(State, DESIRED_STATE)
4      If (state_deviation = TRUE)
5          CRMi Send_Event(State)
6          Event Server Notify ARM
7          Event_Type = CRM_Analysis (State)
8          If (CRMiABLE) Then
8              Actions = CRM_Planning(State,Event_Type)
9              Autonomic_Service ASj = {ASconfig,ASheal,ASoptimization,ASsecurity}
10             Execute ASj (Actions)
11         Else
12             Actions = ARM_Analysis (State, Event_Type)
13             Execute Asj (Actions)
14         EndIf
15     EndIf
16 End While
```

FIG. 5

METHOD AND SYSTEM FOR AUTONOMOUS CONTROL AND PROTECTION OF COMPUTER SYSTEMS

This application claims priority to: U.S. Provisional Patent Application Ser. No.: 60/804424 entitled, "Analysis and Detection Framework for Network and Computer Attacks," filed Jun. 9, 2006; U.S. Provisional Patent Application Ser. No.: 60/804423 entitled, "Autonomic Component Development," filed Jun. 9, 2006, U.S. Provisional Patent Application Ser. No.: 60/804422 entitled, "Anomaly-Based Control and Management Framework," filed Jun. 9, 2006 all of which are encorporated by reference herein in their entirety.

The present invention is generally related to computer systems and more particularly is related to an improved security and efficiency of computer systems.

Network Computing, Internet Appliances, Embedded Systems and Information appliances are being deployed at exponential rates. Landline, Wireless and Mobile communications use will continue to spread throughout society and become pervasive in all aspects of our life. Network failures, whether due to misconfiguration of components, product fatigue, or hacker influence can be expected to grow in complexity and number. The more complex the networked systems and their services, the more difficult to identify the cause of problems that might be triggered by hardware/software failures, organized attacks, performance degradations caused by dynamic behavior of network traffic and loads, etc. The more reactionary the cure is, the greater the potential is for downtime. Sometimes that will mean lost revenue dollars, at other times that can mean significant expense increases or catastrophic results/impacts.

Several significant problems prevent full exploitation of current and emerging information technology and services:
1. Unpredictable performance, reliability and security associated with introduction and delivery of new information services
2. Application instability and excessive downtime due to unpredictable recovery times
3. Unsecure computing systems and services due to the exponential growth in number and the complexity of network and computer attacks
4. Shortage of Information Technology (IT) expertise and automated operations support
5. Rapidly escalating labor costs for Systems Managers, Administrators and support personnel.

There are numerous vendors in the Network and Systems Management (NSM) application space. However, demand is not met due to a number of deficiencies with existing NMS vendors' products. Most products focus on niche areas solving only specific problems as opposed to the customers' complete environment. The best products approximate a view of the entire environment on a static basis. None appear ready to provide a holistic Services Management view and control of the whole communication, computing and application services.

Thus, a heretofore unaddressed need exists in the industry to address the aforementioned deficiencies and inadequacies.

Embodiments of the present invention provide a management system and method for autonomously managing security of a computer system. Briefly described, in architecture, one embodiment of the system, among others, can be implemented as follows. The management system includes a plurality of components within a computer system. A plurality of component resource managers is provided, wherein each of the components is controlled by at least one of the plurality of component resource managers. A plurality of component management interfaces is also provided. Each of the components communicates with at least one of the controlling component resource managers via one of the component management interfaces. At least one runtime manager autonomously controls operation of the components and the component resource managers.

The present invention can also be viewed as providing methods for autonomously managing security of a computer system. In this regard, one embodiment of such a method, among others, can be broadly summarized by the following steps: controlling a plurality of components with a plurality of component resource managers; communicating between the plurality of components and the plurality of component resource managers using a plurality of component management interfaces; and autonomously controlling operation of the components and the component resource managers with at least one runtime manager.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is language for an algorithm that may be used to achieve autonomic management for a system device, in accordance with the first exemplary embodiment of the present invention.

Figures 1, 2:
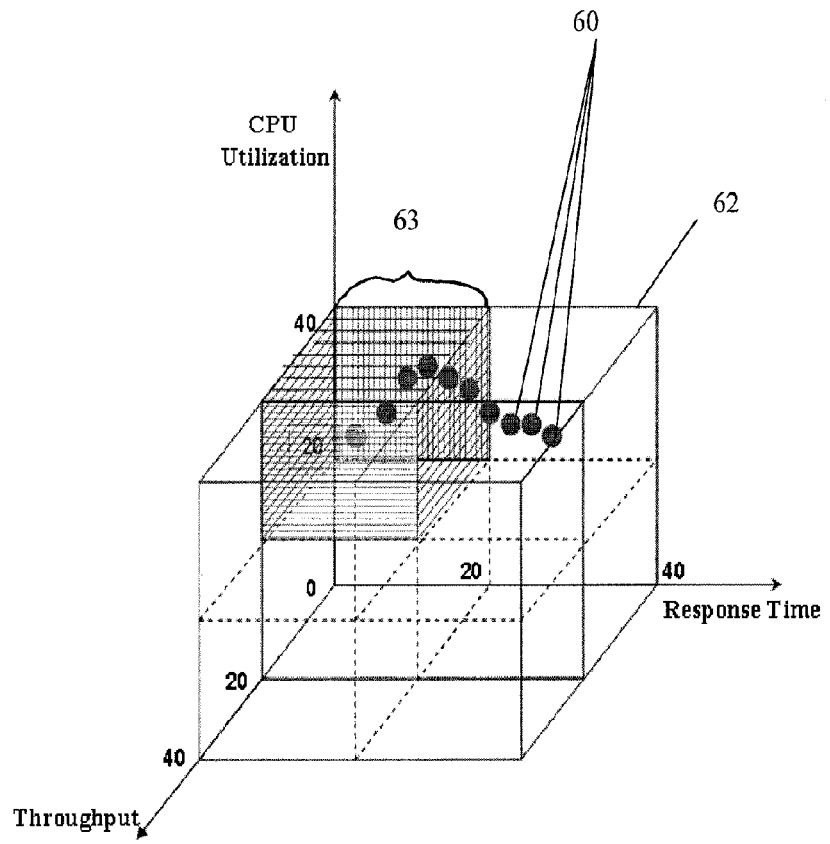
FIG. 1 is chart of quantifiable attributes for a collection of resource classes, in accordance with a first exemplary embodiment of the present invention.
FIG. 2 is a graph of changing various operating points during operation of a CS/A system, in accordance with a first exemplary embodiment of the present invention.

To simultaneously control and manage both the functionality and attributes of a computing system and its services, an integrated monitoring and analysis approach is useful. A first exemplary embodiment of the present invention includes a unified analysis framework 10 to detect any abnormal behavior that might have been caused by failures, performance degradation due to reasons such as poor memory allocation or load imbalance, and network attacks (e.g., viruses, worms, spam or denial of service). FIG. 1 is chart of quantifiable attributes for a collection of resource classes, in accordance with a first exemplary embodiment of the present invention.

The operation of many computing systems can be characterized and quantified with respect to the current usage of its main resources—compute, memory, storage, and network. Each resource can be characterized through certain measurable attributes as shown in FIG. 1.

Anomalies may be detected in an online-analysis approach using statistical and data mining techniques. This approach also may dynamically re-configure the underlying computing environment to bring abnormal behavior back into normal and acceptable behavior. The Operating Point (OP) 60 of a computing system or an application (hereinafter, "CS/A systems" 62) is defined herein as a point in a four-dimensional coordinate space with compute, memory, storage and network along its four coordinate axes. The OP 60 mathematically defines and provides a way of quantifying the operational state of the CS/A systems 62 and is defined as follows:

$$OP(\square) = (OP_c, OP_m, OP_s, OP_n)$$

Where

OP: The operating point 60 for a CS/A system 62 at time instant $\square$.

$OP_c$: The operating point for the compute attribute, which is a function of CPU utilization, completion rate, and response time $OP_m$: The operating point for the memory attribute, which is a function of throughput, page-faults rate and access time $OP_s$: The operating point for the storage attribute, which is a function of access rate, response time and cache hit ratio $OP_n$: The operating point for the network attribute, which is a function of Rx/Tx packets/sec, error rate and latency.

FIG. 2 is a graph of changing various operating points 60 during operation of a CS/A system 62, in accordance with a first exemplary embodiment of the present invention. An acceptable operating zone 63 of CS/A systems 62 can be defined as a range of operating values for each attribute. Due to runtime dynamic conditions changes (e.g., workload and failure), the operating point 60 of a CS/A system 62 may move through acceptable (normal behavior) and/or unacceptable zones (the system does not meet defined operating criteria), as shown in FIG. 2. The goal of monitoring and analysis is to sense and predict the movement of the operating point 60 of the CS/A system 62. Once it is determined the CS/A system 62 is moving toward operation in an unsafe/unacceptable operating zone, a knowledge system is consulted to determine an appropriate corrective technique(s) that will bring back operation of the CS/A system 62 to a normal zone. Behavior and trends of the CS/A system 62 may be continuously monitored and analyzed to proactively detect insider attack activities.

Figure 3:
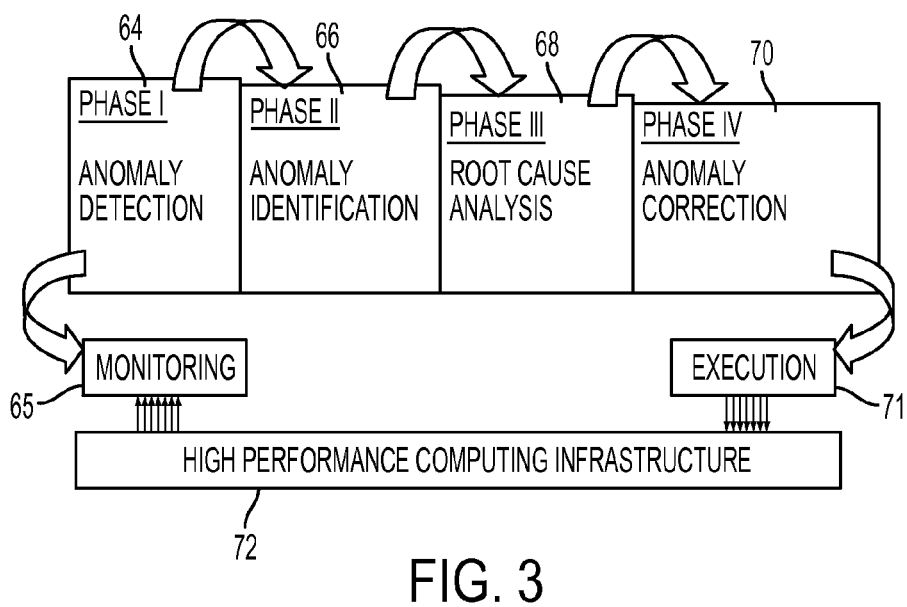
FIG. 3 is a chart of an anomaly-based management framework, in accordance with a first exemplary embodiment of the present invention.

An approach to implementing an autonomic control and management environment follows an anomaly-based management framework, which also may be implemented with autonomic components and systems. FIG. 3 is a chart of an anomaly-based management framework, in accordance with a first exemplary embodiment of the present invention.

In Phase I, anomaly detection 64 uses information theory to perform monitoring 65 of a computing infrastructure 72 and identify the most relevant features for real-time efficient and accurate anomaly detection.

In Phase II, anomaly Identification 66 uses an algorithm to compute anomaly contour recognition functions that capture the differences between normal and anomalous behavior of each attribute of a CS/A system 62 as previously discussed.

In Phase III, root cause analysis 68 may use Bayesian Belief networks and causality analysis techniques to analyze one or more root causes of the detected anomalous behavior.

In Phase IV, anomaly correction 70 may use a resource agent 71 to implement the recovery actions to bring back the CS/A system 62 into normal operational state.

The approach illustrated in FIG. 3 will extend the use of a computing environment and tools, to make software components and/or hardware resources operate in an autonomic manner by following the anomaly based control and management framework.

In the first exemplary embodiment of the present invention, control and management software is attached to a plurality of hardware resources and/or software components such that these resources/components each behaves as an autonomic component to provide an autonomic management system 110. More specifically, each resource/application/component (hereinafter "system device" 124) can be dynamically and substantially automatically configured (self-configuration), substantially seamlessly to tolerate system device 124 failure (Self-healing), while substantially automatically detecting attacks and protect against them (Self-protection), and substantially automatically change configuration parameters to improve performance if performance deteriorates beyond a pre-defined performance threshold (Self-optimization).

Figure 4:
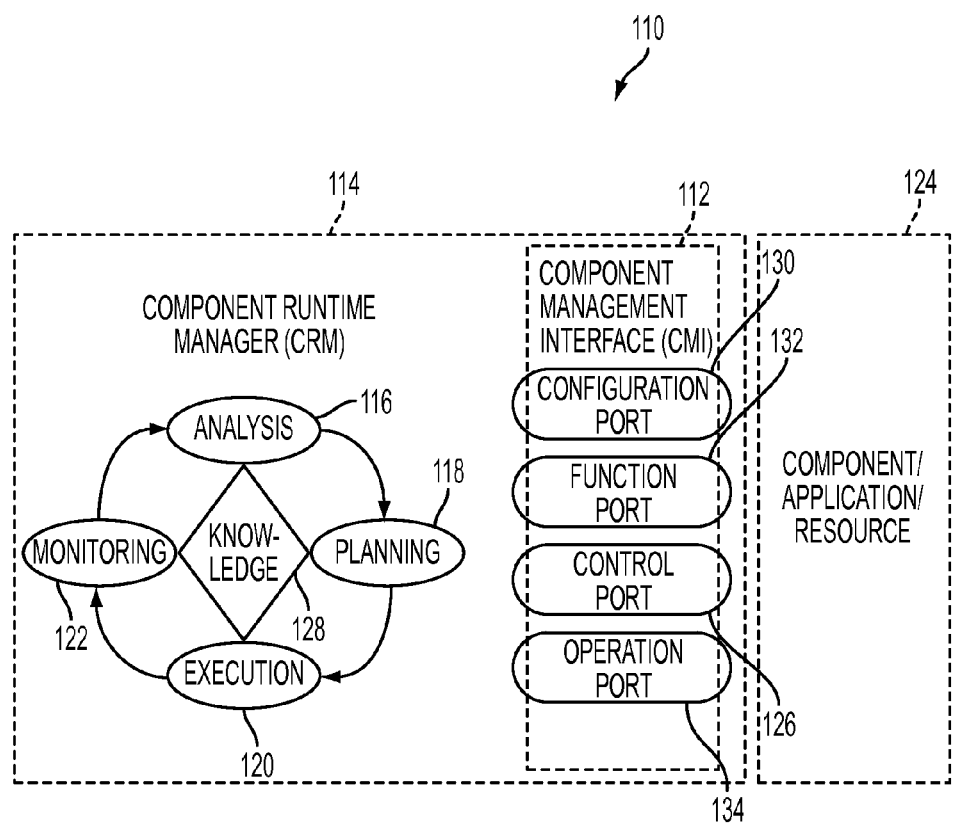
FIG. 4 is a representative illustration of a portion of the autonomic management system, in accordance with a first exemplary embodiment of the present invention.

FIG. 4 is a representative illustration of a portion of the autonomic management system 110, in accordance with a first exemplary embodiment of the present invention. FIG. 4 shows a basic approach to autonomize any software module or resource by adding two software modules: Component Management Interface (CMI 112) and Component Runtime Manager (CRM 114). Each system device 124 that is to be autonomic have a manager that is delegated to manage its execution. The CMI 112 may be used for importing/exporting the functionalities of the computational system device 124, sensing and changing the runtime state of the system device 124 whenever is required and for managing all the attributes (e.g., performance, fault, security) of the computational system device 124. In fact, the CMI 112 may provide a unified management interface to support self-optimizing, self-healing, self-protecting and self-configuring management services. The CRM 114 may repeatedly, frequently, periodically, and/or continuously monitor and analyze the execution of a system device 124 in order to dynamically plan the appropriate corrective actions and then execute them or initiate execution of them to change the execution environment to improve the system device 124 operation at runtime.

The CRM 114 includes an analysis engine 116, a planning engine 118, an execution engine 120, and a monitoring engine 122. The monitoring and analysis engines 122, 116 monitor the system device 124 and its context by using a control (sensor) port 126 interface. The monitoring and analysis engines 122, 116 analyze the information produced by monitoring to determine the state of the system device 124. The planning engine 118 checks to see if the state (the condition in the 'IF condition THEN action shown in FIG. 2) of the system device 124 matches with any of the known states for the system device 124 as stored in the knowledge engine 128. If a match is detected, the planning engine 118 picks up the action corresponding to that state (condition) and the execution engine 120 executes the corresponding action on the system device 124 using the control (actuator) port 126 interface. These rules may be stored in the knowledge engine 128. Note that each rule may be pre-assigned a priority level. The planning engine 118 uses this information to manage a plurality of actions and resolve conflicts.

FIG. 5 is language for an algorithm that may be used to achieve self-management for a system device 124 (self-healing, self-optimizing, self-protecting, etc.), in accordance with the first exemplary embodiment of the present invention. The CRM 114 may monitor the state of one or more active system devices 124 to determine if there are any severe deviations from the desired state (lines 1-3 of the algorithm in FIG. 5). When a change occurs in the system device 124 behavior that merits action, CRM 114 generates an event into an event server, which notifies ARM (lines 4-6). Furthermore, the CRM 114 analyzes the event and determines a further action to handle that event (lines 7 and 8) and executes an appropriate routines (lines 9-10). However, if the CRM 114 cannot handle the problem, the ARM may be invoked to execute the appropriate management functions (lines 12-13) at a higher granularity (e.g., migrate the system devices 124 to another machine due to failure or degradation in performance).

This algorithm may be used to continuously monitor and analyze the behavior of users/applications and their interactions with their environments. Any deviation from the normal base line will be detected by the CRM 114 and based on the impact factor of the abnormal behavior; the CRM 114 may take the appropriate preventive actions.

The CMI 112 provides ports to specify the control and management requirements associated with each system device 124. The four management ports (Configuration Port 130, Function Port 132, Control Port 126 and Operation Port 134) associated with each system device 124 are shown in FIG. 1.

The configuration port 130 defines configuration attributes that are useful to automate a process of setting up the execution environment of a system device 124. The system device 124 configuration attributes that can be defined in this configuration port 130 may include:

System device 124 name, System device 124 version, and System device 124 executable location, System device 124 resource requirements such as Machine Type, OS Type, OS Version, CPU Speed, Memory and Disk size, and Network Bandwidth System device 124 dependency such as software packages that must be installed a priori before the system device 124 can run. It is possible that the system device 124 dependency requirements automatically installing the required resources whenever it is feasible may address these conditions. Otherwise, a configuration error message that the system device 124 cannot be installed may be generated.

The function port 132 may specify the functions to be provided by a system device 124. The function port 132 may be used to define the syntax to be used to invoke each function.

The control port 126 defines at least some of the data that may be monitored and the control functions that may be invoked to self-control and manage the system device 124. The control port 126 includes sensor parts and action parts.

Sensor parts define at least some of the required measurement that may accurately characterize the state of the system device 124 during a window of time. This characterization is important in order to detect abnormal behavior of the system device 124 and invoke the appropriate control actions to correct the abnormality.

Action parts define all the control actions that can be invoked at runtime to fix any abnormal behavior in the managed system device 124.

The operation port 134 defines at least a portion of the policies that must be enforced to govern operations of the system device 124 as well as between various system devices 124. Consequently, the operation port 134 defines two types of rules/policies: Behavior rules and Interaction rules.

Behavior rules may define an operational region that meets the system device 124 requirements for normal and acceptable operations. For example, the CPU utilization and available memory should satisfy pre-defined thresholds, in accordance with the first exemplary embodiment.

Interaction rules may define rules that govern interactions of the system device 124 with other system devices 124. For example, data formats may need to be changed to enable one system device 124 to interact with another system device 124.

The policy rule can be expressed as <IF $Condition_1$ AND $Condition_2$ AND . . . $Condition_m$, THEN $Action_1$ AND $Action_2$ . . . $Action_n$>. Each rule may be expressed with a conjunction of one or more conditions and actions. A condition is a combination of a system device 124 state and measurement attributes or an external event triggered by other system devices 124. An action may invoke a sensor/actuator function in the control port 126.

Figure 6:
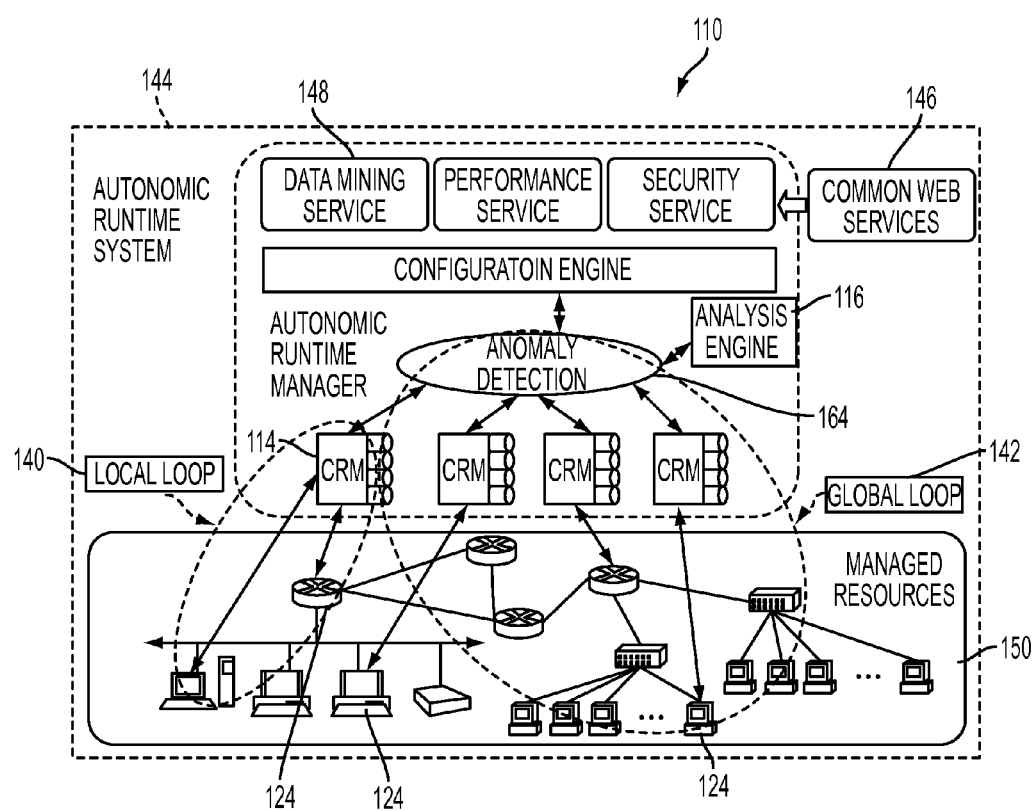
FIG. 6 is an architectural drawing of a portion of the autonomic management system, in accordance with the first exemplary embodiment of the present invention.

FIG. 6 is an architectural drawing of a portion of the autonomic management system 110, in accordance with the first exemplary embodiment of the present invention. The architecture shown in FIG. 6 is developed based on an anomaly-based control and management framework, as shown in FIG. 3. A control and management scheme is based on two control loops: local control loop 140 and global control loop 142. The local control loop 140 may manage the behavior of individual and local system resources on which the system devices 124 execute. The local control loop 140 can be viewed as adding self-managing capabilities to conventional system devices 124. The local control loop 140 may control local algorithms, resource allocation strategies, distribution and load balancing strategies, etc. The local loop control 140 may be blind to the overall behavior and thus unable to independently achieve the desired overall objectives. Thus, without an additional loop, it can lead to sub-optimal behavior. Unlike the local control loop 140 that focuses on local optimal, the global control loop 142 may manage the behavior of the overall system devices 124 and will define the knowledge that will drive the local adaptations. The global control loop 142 can handle unknown environment states and uses four system attributes for monitoring and analysis such as performance, fault-tolerance, configuration and security.

The main software modules of the anomaly based control and management architecture include autonomic runtime system (ARS) 144, common web services 146, autonomic runtime manager 148, and managed resources 150.

The Autonomic Runtime System (ARS) 144 may exploit temporal and heterogeneous characteristics of the applications, and the architectural characteristics of the computing and storage resources available at runtime to achieve high-performance, scalable, secure and fault tolerable applications. ARS 144 will provide appropriate control and management services to deploy and configure the required software and hardware resources to autonomously (e.g., self-optimize, self-heal) run large-scale networked applications in computing environments. The local control loop 140 is responsible for control and management of one autonomic system device 124, while the global control loop 142 is responsible for the control and management of an entire autonomic application.

The ARS 144 can be viewed as an application-based operating system that provides applications with all the services and tools required to achieve the desired autonomic behaviors (self-configuring, self-healing, self-optimizing, and self-protection). The primary modules of ARS 144 include the common web services 146, the ARM 148, and the managed resources 150.

The common web services 146 may provide appropriate control and management web services to deploy and configure the required software and hardware resources to run autonomously (e.g., self-optimize, self-heal etc.). The runtime services maintain the autonomic properties of applications and system resources at runtime.

The ARM 148 focuses on setting up the application execution environment and then maintaining its requirements at runtime. Similar to CRM 114 in Autonomic Component, ARM 148 performs control loops 140, 142 on an application level. The ARM 148 main modules include 1) Online Monitoring and Analysis through CRM 114, 2) Anomaly Detection, and 3) Analysis Engine.

The MR 150 includes all system devices 124 to be managed. Detecting and protecting against insider attacks may involve encapsulating each system device 124 with CRM 114 as explained previously.

The main software modules to implement this framework are the following: 1) online Monitoring/Filtering Engine, 2) online Analysis Engine, 3) Online Clustering Engine, 4) Self-Protection Engine.

The online monitoring engine collects three categories of data from the Managed Resources 150. First, a collector module in the online monitoring engine collects capture Net-Flow packets and store them in a database (e.g., MySQL). Second, the online monitoring engine collects the system resource-related information including the CPU and memory utilization, I/O status. Third, the online monitoring engine collects the applications/processes running information.

Based on research into dependency and correlation analysis of network features, the most important and relevant features that can accurately quantify the characteristics of network activities with respect to certain types of decisions (e.g., normal or abnormal behavior) are developed in real-time. The number of features to be monitored and analyzed is reduced, and thus the approach is scalable and can be applied to large-scale network infrastructures.

Insider attacks such User to Root (U2R), ARP poisoning, classified information stealing will produce abnormal network behaviors that can be accurately distinguished from normal behaviors when these metrics are used to characterize the network behavior. The online monitoring engine is implemented as a high-performance multithreaded system that can simultaneously retrieve monitored data from different platforms (windows and Linux) and tools (NetFlow, tcpdump, etc.) and then pass them to the online filtering engine.

Because of the high rate of reports from the Netflow monitors (5 million records a day for just 20 computers), Discrete Fourier Transformations (DFT) are performed on the stream data records in order to reduce the processing overhead of the online analysis engine. The DFT converts the time domain values into the frequency domain with a smaller number of coefficients while maintaining the signal energy (network traffic behaviors). The DFT captures the salient features of the underlying data stream on the fly. For a given window w of values $\vec{X}=x[t-w+1], \ldots x[t]$, an "incremental" transformation $F(\vec{X})$ obtains a signature that represents accurately the behavior of the data stream being analyzed. Therefore, all data stream values are safely disregarded, except the very first few coefficients to retain the salient features (e.g., the overall trend) of the original signal.

By using few coefficients, the dynamic behavior of the monitored data is preserved. Thus the size of the data to be stored and analyzed is reduced, and this will significantly simplify the computations of auto-correlations and cross-correlations among different monitored network features. By following this approach, online sophisticated statistical metrics (auto-correlation, cross-correlations among several features) can be computed in order to accurately detect anomalous behaviors and thus being able to generate online network attack signatures.

By reducing the correlation coefficient to Euclidean Distance, techniques can be applied to report sequences with correlation coefficients higher than a specific threshold. The change of correlation may be used to quantify the intensity of the abnormal behavior of network operations and services. Those having ordinary skill in the art will recognize there are several possibilities for quantifying the intensity of the abnormal behavior of network operations and services.

Figure 7:
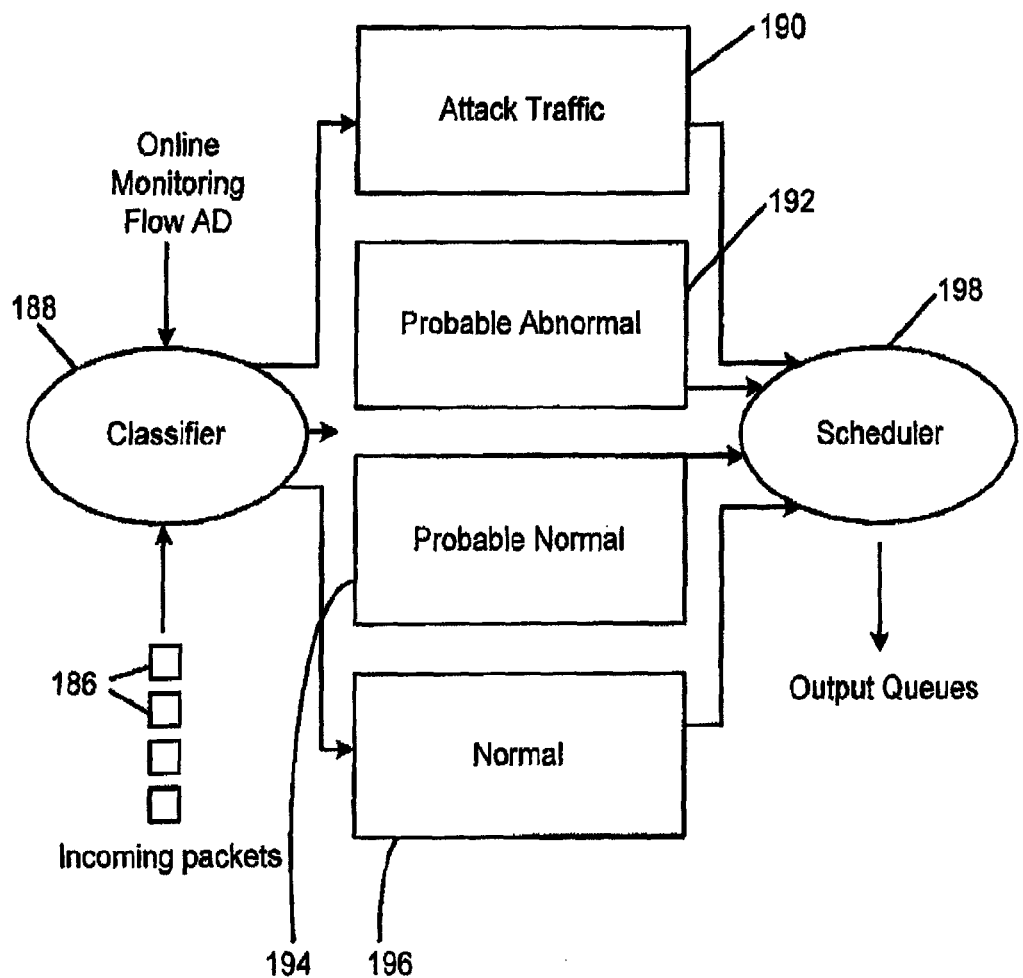
FIG. 7 is a graph of a classification system for the autonomic management system, in accordance with the first exemplary embodiment of the present invention.

In order to detect insider attacks, a profile of the normal behavior of a network node may be built. After applying the DFT operation to the stream data, a window of data items may be converted into fewer numbers of coefficients in frequency domain. Hence, fewer network attributes are required to be analyzed in real-time. These network attributes are applied to an enhanced real-time algorithm based on clustering techniques to produce a training profile. FIG. 7 is a graph of clustering training 178, in accordance with a first exemplary embodiment of the present invention. For example, point A is the core of the HTTP protocol cluster 180. If the observed point B is beyond the HTTP protocol cluster 180, then an alarm will be fired for this abnormal behavior. From the analysis in the last section, we know that the distance 182 between B and A is the auto-correlation of the HTTP behavior of a node. Other devices will have other clusters 184 reflecting normal/abnormal behavior.

The signature for a network attack is the pattern generated by the clustering results. The quality of the signature may be quantified using the core and diameter of the cluster. The core point of a cluster may be used to identify a class of protocols or application activities. The diameter is adopted from the abnormality distance metric, as described herein. Hence the cluster can sustain both the specificity and generalization requirements of the system. During runtime, the merging of multiple clusters into one or disjoint ones enable an adaptation to changes in network behaviors and also to generate new signatures as new attacks are launched and discovered.

A self-protection engine takes actions on the routers based on the results and recommendations produced by the online analysis engine. The actions taken can be in the form of an extended Access Control List (ACL). When the online analysis engine senses abnormal behaviors in the network, it will report the attacker's IP address, attacker's port number, and victim's IP address. The self-protection engine may traverse the network and locate the nearest router to add a new extended ACL.

The present system, in accordance with the first exemplary embodiment of the present invention, does not restrict flow of the transmission control protocol (TCP) connection definition. Instead, flow is based on traffic satisfying specified temporal and spatial locality conditions. Flow represents actual traffic activity from one or both of the transmission endpoints for any communication as perceived by a given network management point. Flow is active as long as observed packets meet flow specification and arrive within a specified timeout value. Flow abnormality rate attributes include: packet rate (PR) per destination, aggregate flow rate (AFR) per destination, and number of unsuccessful sessions (NUSs), as defined herein.

PR per destination is used to determine the current packet rate for a given destination IP address $D_j$ as observed by a flow monitor and can be computed as:

$$PR(f_i, D_j, t) = \frac{\sum_{t=T}^{2T} pkt(t)}{T}$$

where pkt denotes the number of packets belonging to a flow $f_i$, and to a destination $D_j$ within a given time interval T.

AFR per destination denotes the current packet rate as observed by a flow monitor within a router for all the flows (fk) that go through the same input interface (Ii) and have the same destination IP address (Dj). This metric can be computed as:

$$AFR(D_j, I_i, t) = \Sum_{\Box k} PR(f_k, D_j, t)$$

NUS is the number of unsuccessful sessions for a destination Dj as observed by a flow monitor. It can be computed as:

$$NUS(D_j, t) = \Sum_{\Box i}(1 - s_i)$$

where $s_i$ is a binary variable that is equal to 1 when the session is successful and 0 when it is not. Thus, abnormality metrics may be used by the analysis engine 116 to provide self-protection services to the autonomic management system 110. Network states can be characterized and quantified using abnormality metrics.

The present system, in accordance with the first exemplary embodiment of the present invention, distinguishes between normal and attacking traffic while maintaining operation, whereas other systems will deny all traffic when attacking traffic is sensed. The abnormality distance metric may be used to classify traffic into multiple classes. FIG. 7 is a graph of a classification system, in accordance with the first exemplary embodiment of the present invention. As shown, incoming packets 186 enter a classifier 188 wherein an abnormality distance is determined for each incoming packet 186. In this embodiment, the incoming packets 186 are then classified into one of four categories 190, 192, 194, 196, although varying numbers of categories and subcategories are considered to be within the scope of the present invention. Identified attacking traffic is classified as Attack Traffic 190, likely attacking traffic is classified as Probable Abnormal 192, unlikely attacking traffic is classified as Probable Normal 194, and non-attacking traffic is classified as Normal 196. These classifications are made in accordance with preset abnormality distance parameters for each category. Once categorized, the data packets are advanced to the scheduler 198, which outputs the data packets categorized as least threatening with the greatest speed, more questionable data packets at proportionally reduced speed and known Attack Traffic 190 may be stopped or rerouted altogether.

Figure 8:
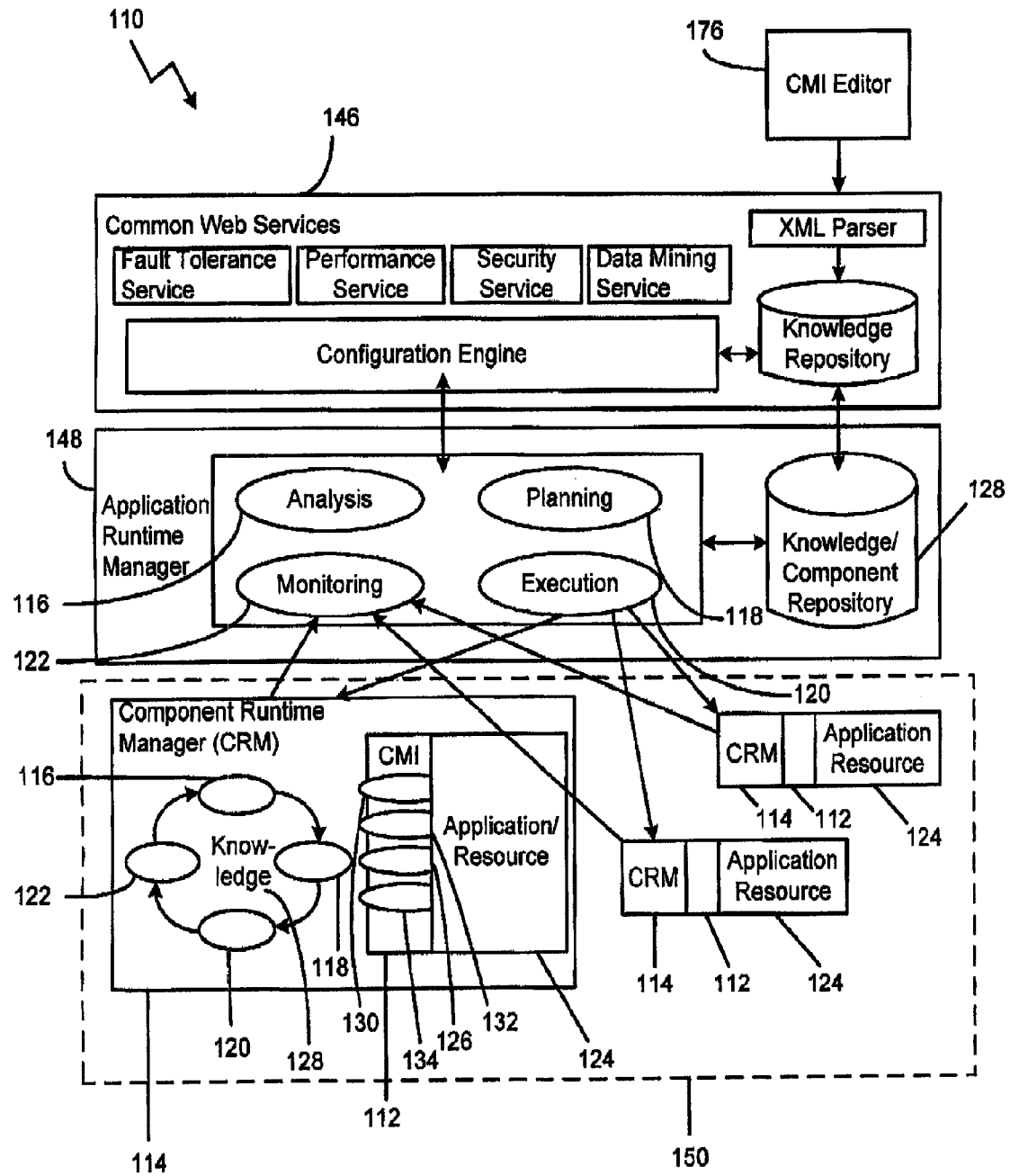
FIG. 8 is an architectural drawing of the autonomic management system shown in FIG. 4 and in FIG. 6, in accordance with the first exemplary embodiment of the present invention.

FIG. 8 is an architectural drawing of the autonomic management system 110 shown in FIG. 4 and in FIG. 6, in accordance with the first exemplary embodiment of the present invention. A CMI editor 176 is used to specify the application initial configuration and dynamic configuration using the CMI ports 126, 130, 132, 134. The common web services 146, such as default tolerant service and performance service, are provided and can be invoked by the ARM 148 and the CRM 114.

FIG. 8 shows the hierarchy of the present system, in accordance with the first exemplary embodiment. The ARM 148 handles application level configuration, while the CRM 114 handles component level configuration. The managed resources 150 may include several distributed components, where each is managed by a CRM 114 and has a CMI 112 communicating with the service device 124. Thus, the autonomic management system 110 is able to manage autonomously on both a micro level and a macro level.

During initialization and setup phase, the ARM 148 executes the configuration tasks as specified in the CMI configuration port 130. Executing configuration tasks involves determining the required resources and components, their locations through a discovery service, loading the required software components and then starting their execution.

During the runtime phase, the ARM 148 and the CRM 114 maintain the operations of each resource and component according to the self-configuration strategies as specified in the CMI ports 126, 130, 132, 134. Self-configuration management is implemented using the analysis engine 116, the planning engine 118, the execution engine 120, and the monitoring engine 122.

What is claimed is:

1. A management system, comprising:
    a plurality of components within the computer system, wherein the computer system comprises a network interface configured to receive network-traffic data;
    a plurality of component resource managers, wherein each of the components is controlled by at least one of the plurality of component resource managers;
    a plurality of component management interfaces, wherein each of the components communicates with at least one of the controlling component resource managers via one of the component management interfaces;
    a monitoring engine within each of the component resource managers in communication with at least one of the components through one of the component management interfaces, wherein the monitoring engine collects monitoring data corresponding to the network-traffic data;
    an analysis engine within each of the component resource managers having at least one algorithm responsive to the monitored network-traffic data, wherein the analysis engine classifies network-traffic data communicated through components as one of at least normal and attacking according to an abnormality metric for the network-traffic data, wherein the abnormality metric is based on at least a packet rate, a flow rate, and a number of unsuccessful sessions found in the network-traffic data, and wherein network-traffic data having the abnormality metric in accord with at least one predetermined abnormality distance parameter is classified as attacking; and
    at least one runtime manager autonomously controlling operation of the components and the component resource managers, wherein the runtime manager routes the network-traffic data according to the anomalous activity classification.

2. The management system of claim 1, further comprising a control port within the component management interface communicatively connecting the analysis engine and the monitoring engine with the at least one of the components.

3. The management system of claim 1, wherein each component is in communication with only one of the plurality of component resource managers.

4. The management system of claim 1, wherein the analysis engine classifies network-traffic data communicated through components as one of at least of: normal, probable normal, probable attacking, and attacking.

5. A method, comprising:
    controlling a plurality of components with a plurality of component resource managers;

communicating between the plurality of components and the plurality of component resource managers using a plurality of component management interfaces;
autonomously controlling operation of the components and the component resource managers with at least one runtime manager;
classifying data communicated through components as one of at least a normal classification and an attacking classification according to an abnormality metric for the data, wherein the abnormality metric is based on at least a packet rate, a flow rate, and a number of unsuccessful sessions found in the data, and wherein data having the abnormality metric in accord with at least one predetermined abnormality distance parameter is classified as attacking; and
routing the data according to the anomalous activity classification.

6. The method of claim 5, further comprising communicating between one of the components and one of the component resource managers using one of the component management interfaces.

7. The method of claim 5, further comprising monitoring for anomalous activity using the component management interfaces.

8. The method of claim 5, wherein the data having the abnormality metric in accord with the at least one predetermined abnormality distance parameter is classified according to at least three distinct classifications.

9. The method of claim 5, further comprising:
data-mining the component resource managers to collect activity data.

10. The method of claim 5, further comprising:
data-mining the component resource managers to collect activity data;
compiling the activity data; and
defining anomalous activity classifications according to activity data compilations.

11. The method of claim 8, wherein the at least three distinct classifications comprise the normal classification, a probable normal classification, a probable attacking classification, and the attacking classification.

12. A management system comprising:
a network interface configured to receive network-traffic data;
computer readable program code for controlling a plurality of components with a plurality of component resource managers;
computer readable program code for communicating between the plurality of components and the plurality of component resource managers using a plurality of component management interfaces;
computer readable program code for autonomously controlling operation of the components and the component resource managers with at least one runtime manager;
computer readable program code for classifying network-traffic data communicated through components as one of at least normal and attacking according to an abnormality metric for the network-traffic data, wherein the abnormality metric is based on at least a packet rate, a flow rate, and a number of unsuccessful sessions found in the network-traffic data, wherein network-traffic data having the abnormality metric in accord with at least one predetermined abnormality distance parameter is classified as attacking; and
computer readable program code for routing the data according to the anomalous activity classification.

13. The management system of claim 12, further comprising computer readable computer code for monitoring for anomalous activity using the component management interfaces.

14. The management system of claim 12, further comprising:
computer readable computer code for data-mining the component resource managers to collect activity data.

15. The management system of claim 12, further comprising:
computer readable computer code for data-mining the component resource managers to collect activity data;
computer readable computer code for compiling the activity data; and
computer readable computer code for defining anomalous activity classifications according to activity data compilations.

16. The management system of claim 12, wherein the computer readable program code for classifying network-traffic data communicated through components classifies the network-traffic data as one of at least of: normal, probable normal, probable attacking, and attacking.

* * * * *